Figure 1:
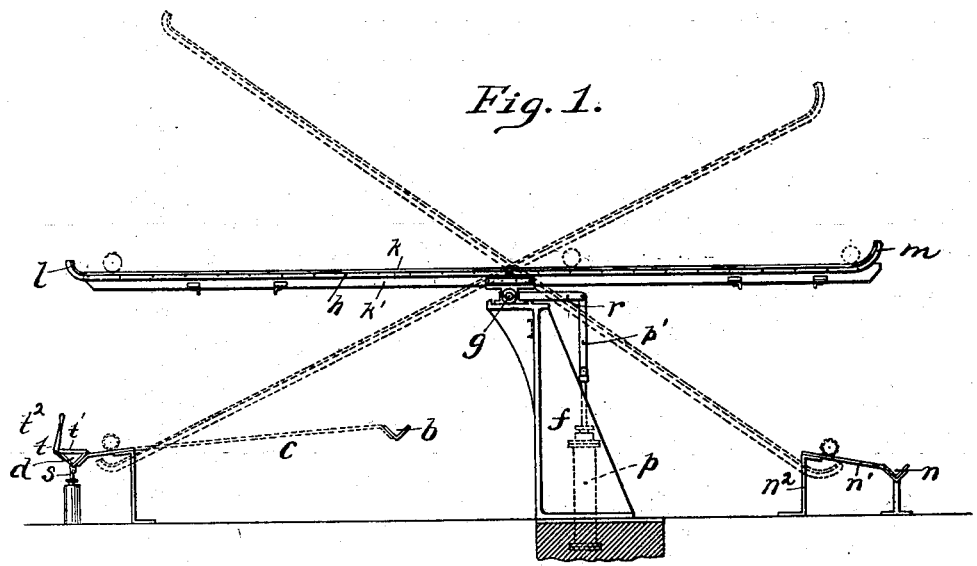

No. 647,870. Patented Apr. 17, 1900.
P. C. PATTERSON.
APPARATUS FOR TRANSFERRING TUBES OR BARS.
(Application filed July 5, 1898.)
(No Model.) 2 Sheets—Sheet 1.

Witnesses:

Inventor:
Peter Charles Patterson
By Kay & Totten
Attorneys.

No. 647,870. Patented Apr. 17, 1900.
P. C. PATTERSON.
APPARATUS FOR TRANSFERRING TUBES OR BARS.
(Application filed July 5, 1898.)
(No Model.) 2 Sheets—Sheet 2.

Witnesses:

Inventor:
Peter Charles Patterson
By Kay McTotter
Attorneys.

UNITED STATES PATENT OFFICE.

PETER CHARLES PATTERSON, OF McKEESPORT, PENNSYLVANIA, ASSIGNOR TO THE NATIONAL TUBE COMPANY, OF NEW YORK, N. Y., AND PITTSBURG, PENNSYLVANIA.

APPARATUS FOR TRANSFERRING TUBES OR BARS.

SPECIFICATION forming part of Letters Patent No. 647,870, dated April 17, 1900.

Application filed July 5, 1898. Serial No. 685,220. (No model.)

*To all whom it may concern:*

Be it known that I, PETER CHARLES PATTERSON, a resident of McKeesport, in the county of Allegheny and State of Pennsylvania, have invented a new and useful Improvement in Apparatus for Transferring Tubes or Bars; and I do hereby declare the following to be a full, clear, and exact description thereof.

My invention relates to devices for transferring tubes, round bars, &c., from one place to another in connection with their manufacture. Its special use as heretofore employed has been in connection with transfer of tubing in course of manufacture where for any reason it is desired to carry the same from one side of the works to the other without interfering with anything on the same level as that at which the tube is taken up by the transfer device.

In the manufacture of tubing it often occurs that a tube requires a second welding pass—that is, that after the tube-skelp has been fed to the furnace, heated, and welded within the welding-rolls the skilled workman can by a quick examination determine whether a perfect weld has been formed or whether it requires a second pass through the furnace and rolls. It is very desirable to provide a means for taking up such tubing and transferring it back to the feeding end of the welding-furnace or provide for its passage to other parts of the works, where it can be prepared for the second welding without interfering with the passage of the perfectly-welded tubes on their way through the finishing-rolls to the cooling-table or with the other operations of the plant. The present invention provides an overhead transferring apparatus by which this can be quickly accomplished without interfering with the regular operation of the mill. It comprises, generally stated, an overhead rocking or tilting frame or seesaw mounted on suitable bearings and having upwardly-extending ends forming hooks or seats to hold the tubing thereon, so that when one end of the rocking frame is lowered the tube can be brought above it, and by the lifting of that end of the rocking or tilting frame the tube will be first carried up by the frame and then caused to roll down the frame to the other end thereof, when it is caught by the hooks or upwardly-extending end, and while held by the same that end of the rocking frame can be lowered and the tube thus delivered from the frame in position to pass over to the feeding end of the welding-furnace or to any other place desired in the works.

To enable others skilled in the art to make and use my invention, I will describe the same more fully, referring to the accompanying drawings, in which—

Figure 2:
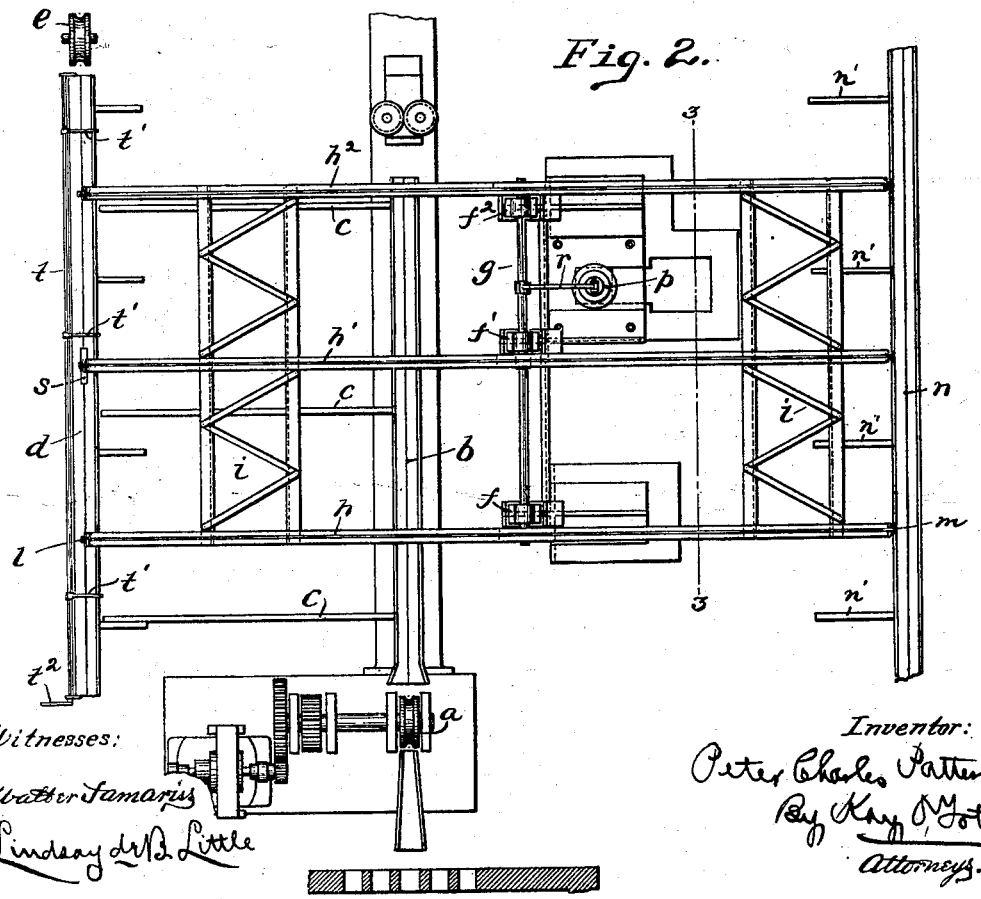
Figure 3:
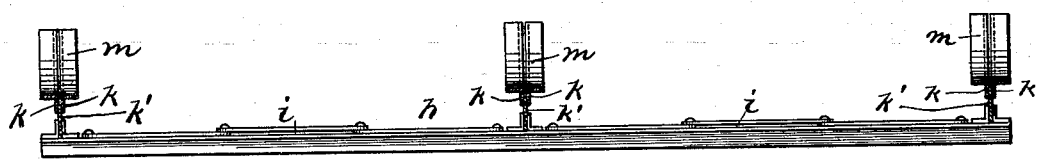
Figure 4:
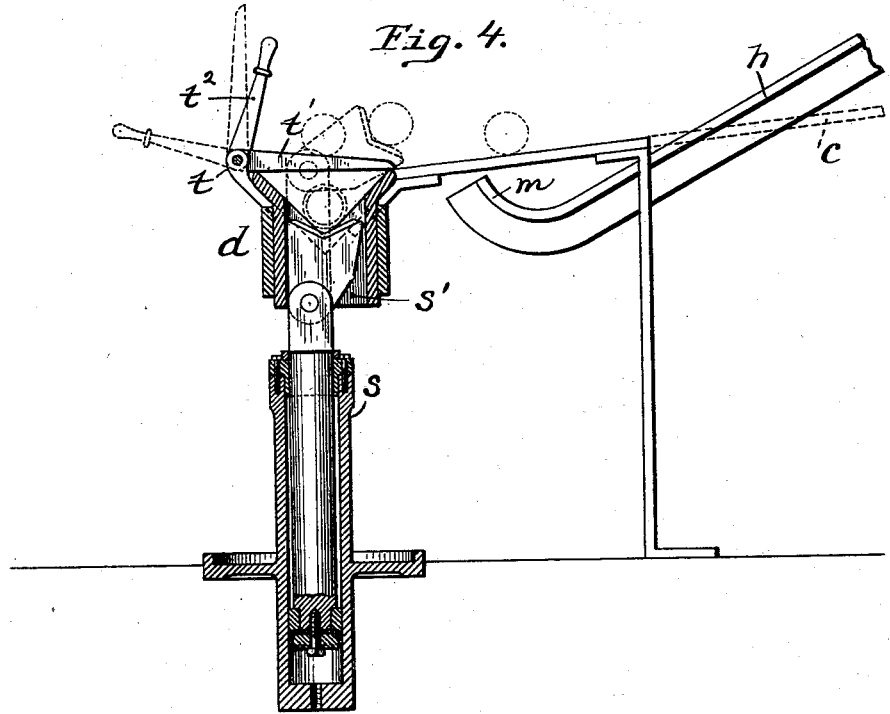

Figure 1 is a front elevation of the apparatus. Fig. 2 is a top or plan view thereof. Fig. 3 is a sectional view of the frame on the line 3 3, Fig. 2; and Fig. 4 is an enlarged view illustrating the way of transferring the tube from the trough onto the swinging frame.

Like letters of reference indicate like parts in each of the figures.

The transferring apparatus forming the subject-matter of this invention has usually been employed in connection with tube-welding apparatus, being arranged over the welding plant so that as a tube passes through that plant and is examined it can either pass onto the finishing-rolls or be taken up by the transfer-frame. For this purpose I have illustrated the invention, showing its preferred location in connection with an ordinary set of welding-rolls, which are to be understood as being located in front of a regular welding-furnace. The rolls $a$ deliver the welded tube into the trough $b$, where, after the withdrawal of the mandrel carrying the welding-ball between the rolls, the tube passes down the inclined way $c$ into the trough $d$, said trough being located just in front of the sizing-rolls $e$, to which the tube is fed from the trough $d$. The inclined way $c$ is formed with a series of bars, down which the welded tube rolls into the trough. At one side of the welded mechanism are the standards $f\ f'\ f^2$, in which is mounted the rock-shaft $g$ of the tilting frame, said frame being formed of the longitudinally-extending arms $h\ h'\ h^2$, rigidly secured to the rock-shaft $g$ and connected at or near the ends by the bracing-frames $i$. The longitudinally-extending arms of the frame are formed of angle-bars $k$ and a central plate $k'$, as shown in detail in Fig. 3, and the angle-bars $k$ are curved upwardly from the plate at each end, forming the curved seat or hook portion $l$ at one end of the apparatus and the like seat $m$ at the other end of the apparatus. The receiving ends of the tilting arms $h\ h'\ h^2$ extend down between the bars forming the inclined way $c$, above referred to, so that the tube which is to be transferred can be held upon said inclined way or lifted from the trough $d$ onto the same in such position that it may be engaged by the swinging arms, which are lowered below the inclines and lift the tube from the same. The upper surfaces of the longitudinally-extending arms form smooth guideways down which the tube rolls to the delivery end of the frame, where the seats or upwardly-curved portions $m$ catch and hold the tube and prevent its escape from the frame, holding the same until the frame is tilted or rocked so as to lower the delivery end thereof down in close proximity to the trough $n$, there being the delivery-table $n'$ in front of the trough, formed of inclined bars connected to the trough and to the standards $n^2$, between which bars the delivery ends $m$ of the tilting frame drop so as to deliver the tube onto the inclined bars, down which it rolls into the trough $n$. It can then be carried forward in any suitable way to the feeding end of the welding-furnace or may be carried backwardly in the opposite direction along the trough for any other purpose, such as the repair or treatment of the tube before it is again passed into the welding-furnace and rewelded.

In order to operate this tube-transferring device, any suitable mechanism can be employed, that shown being suitable. I provide the power-cylinder $p$, connecting to the pitman $p'$, which in turn connects to the lever $r$, rigidly secured to the rock-shaft $q$ of the tilting frame, the operation of the cylinder being controlled by suitable valve mechanism, as is usual, so as to tilt the frame when necessary. In the trough $d$ I may provide the hydraulic lift or ram $s$, the top of which extends up through the base of the trough, as at $s'$, and has a V-shaped top face, so as to engage with the tube in the trough and lift it out of the trough, so that it can be easily swung onto the inclined frame $c$ and over the receiving end $l$ of the tilting frame. As the defect in the tube may be noted by the workman before it enters the trough, to overcome the necessity of lifting the tube out of the trough I provide the catcher $t$, pivoted to the side of the trough opposite to the inclined way $c$ and drawing a series of fingers $t'$, adapted when lowered to extend across the trough and close the same, so that the tube will simply roll over the fingers and back onto the inclined way in position to be raised by the tilting frame. The catcher is operated by the hand-lever $t^2$.

When the apparatus is in use in connection with tube-making, it rests normally in horizontal position, as shown in full lines, and to receive the tube it is lowered, as shown in dotted lines in Fig. 1. The tube having been welded in the usual way and the mandrel-bar withdrawn, the tube is rolled down the inclined way $c$ into the trough $d$, where the operator can examine the same and by rotating it in the trough see whether it is in proper condition for passage to the sizing or finishing rolls. If it is, he pushes it forward into those rolls, after which it passes in the usual course for finishing. If a defect is found in the tube which requires further treatment, either re-welding or repair before rewelding, the operator raises the tube by means of the hydraulic lift $s$ and swings it onto the inclined way above the receiving end $l$ of the tilting frame, and the frame is then lifted, the tube being held by the hooked portion of such receiving end until the tilting frame is brought to substantially-horizontal position. The receiving end of the frame is then raised slightly, so as to cause the tube to roll down the same to the delivery end $m$, where it is caught by the seat or hooked portion at that end and held, and the frame is then lowered in the second dotted position shown in Fig. 1, where the tube is delivered by the frame onto the inclined way $n'$ and rolls into the trough $n$, from which, as above stated, it can either pass forward to the feeding end of the welding-furnace or in any other direction desired. In case the defect is discovered before the tube rolls into the trough the operator lowers the catcher $t$ and the tube rolls onto the same, and he then lowers the transfer-frame and rolls the tube back onto the inclined way $c$ in position to be lifted by the frame. It is evident that while this frame is particularly applicable in connection with the transfer of tubing and like bodies in a heated condition in connection with the manufacture of wrought-metal tubing it is applicable to many other uses where any cylindrical body or even non-cylindrical bodies are to be transferred from place to place without interfering with mechanism which may be arranged along the same plane as the receiving-point of the transfer device, and my invention is not therefore limited to use in connection with the manufacture of tubing, but may be employed for the transfer of any articles with which it would be useful.

What I claim as my invention, and desire to secure by Letters Patent, is—

1. The combination of a rolling-mill, a receiving-trough back of the same, a trough at one side of the receiving-trough and guide-bars connecting the receiving-trough with said side trough, and a tilting transfer-frame mounted on standards above the receiving-trough and adapted to swing down into proximity with the side trough and receive and carry the blank over the receiving-trough, substantially as and for the purposes set forth.

2. The combination of a rolling-mill, a receiving-trough behind the same, troughs on both sides of the receiving-trough, guide-bars connecting the receiving-trough and one side trough, and a tilting transfer-frame mounted on standards above the receiving-trough and adapted to swing down into proximity with one side trough and receive and carry the blank over the central receiving-trough and deliver it to the second trough, substantially as set forth.

3. The combination of a trough, and a tilting transfer-frame having an upwardly-extending portion forming a seat at its end adapted to swing down in proximity to said trough, and stationary guide-bars extending from the trough toward the swinging frame, substantially as set forth.

4. In a transfer device, the combination with a trough, of a skeleton guideway leading thereto, and a tilting skeleton frame having an upwardly-extending portion forming a seat at its end and adapted to swing between the skeleton guide leading to said trough and below the level of the trough itself, substantially as and for the purposes set forth.

5. In a transfer device, the combination of a trough having a hydraulic lift under the same and provided with a lifting-head extending up within and adapted to rise above the trough, and a rocking frame mounted on standards and having an upwardly-extending end portion or seat adapted to be brought into receiving position with said trough, substantially as and for the purposes set forth.

6. The combination of a trough, and a tilting transfer-frame having an upwardly-extending portion forming a seat at its end adapted to swing down in proximity to said trough, and a pivoted catcher adapted to swing over and close the trough, substantially as set forth.

In testimony whereof I, the said PETER CHARLES PATTERSON, have hereunto set my hand.

PETER CHARLES PATTERSON.

Witnesses:
JAMES I. KAY,
ROBT. D. TOTTEN.